United States Patent [19]
Maddox

[11] Patent Number: 6,000,024
[45] Date of Patent: Dec. 7, 1999

[54] PARALLEL COMPUTING SYSTEM

[75] Inventor: James L. Maddox, Philadelphia, Pa.

[73] Assignee: Fifth Generation Computer Corporation, New York, N.Y.

[21] Appl. No.: 08/950,606

[22] Filed: Oct. 15, 1997

[51] Int. Cl.$^6$ ................................... G06F 15/00
[52] U.S. Cl. .......................... 712/11; 710/22; 709/252; 709/238
[58] Field of Search ............ 395/820.11–820.22, 395/307, 200.82; 712/10–22; 710/22, 126, 127, 131; 709/212, 238, 252, 243; 340/825.03, 825.79, 825.02, 825.07; 714/3; 382/302, 181; 370/351, 407, 408; 379/219, 242; 711/100

[56] References Cited

U.S. PATENT DOCUMENTS

| | | | |
|---|---|---|---|
| 4,843,540 | 6/1989 | Stolfo | 712/11 |
| 4,860,201 | 8/1989 | Stolfo et al. | 712/11 |
| 4,910,669 | 3/1990 | Gorin et al. | 712/17 |
| 5,020,059 | 5/1991 | Gorin et al. | 714/3 |
| 5,038,386 | 8/1991 | Li | 382/302 |
| 5,166,674 | 11/1992 | Baum et al. | 340/825.07 |
| 5,353,412 | 10/1994 | Douglas et al. | 709/243 |
| 5,446,915 | 8/1995 | Pierce | 712/11 |
| 5,561,768 | 10/1996 | Smith | 712/13 |

OTHER PUBLICATIONS

Youn et al., "On Implementing Large Binary Tree Architecture in VLSI and WSI" IEEE, pp. 526–537, 1989.

Tzeng et al., "Binary Tree Layouts with Adequate I/O Support," IEEE, pp. 1612–1615, 1990.

Bridges, "The Function of a Connection Network Between Host and Processing Elements in Massively Parallel Computer Systems," IEEE, pp. 455–458, 1988.

*Primary Examiner*—John A. Follansbee

[57] ABSTRACT

A binary tree computer system connected to a host computer that includes N bus controllers connected in a binary tree configuration in which each bus controller except those at the extremes of the tree are connected to left and right child bus controllers, where N is an integer. One of the bus controllers is a root bus controller that connects the binary tree to the host computer. Each of the bus controllers has an associated processing element attached thereto and two processing elements are connected to each of the bus controllers at the extremes of the binary tree. Each of the processing elements includes a microprocessor and an associated memory. Each of the bus controllers includes, for each of the processing elements connected thereto, a buffered interface connecting the processing element to the bus controller for transmitting instructions and data between the bus controller and the processing element, and for writing and reading information into and from the memory of the processing element without involving the microprocessor.

10 Claims, 4 Drawing Sheets

PARALLEL COMPUTING SYSTEM

This invention relates generally to parallel computing systems and more particularly to improved parallel computing systems arranged in a binary tree structure.

BACKGROUND OF THE INVENTION

Parallel computing systems are known in which a plurality of individual processing elements, each including a microprocessor, associated memory and an input/output (I/O) device, are arranged in a binary tree configuration. One of the processing elements, referred to as the "root" processing element is connected to a host system and to two "child" processing elements. Each such child processing element in turn is a "parent" for two child processing elements connected thereto. The processing elements at the extremes of the tree are referred to as "leaf" processing elements, and have no additional children. Thus, in a binary tree computer, a large number of processing elements may be connected so that each processing element, except those at the root and the leaves of the tree, has a single parent and two (right and left) child processing elements.

U.S. Pat. Nos. 4,860,201 and 4,843,540 to Stolfo, that are assigned to the assignee of the present invention, describe such a system and are hereby incorporated by reference.

While the system described in the '201 and '540 patents represented a substantial step forward in the art, a number of problems remained. The system required the use of special parallel programming languages and could not be programmed using standard, commercially available languages. The system required specially trained programmers, who are not generally available, and the programs written could not be compiled using commercially available compilers. Additional significant limitations to such prior computer systems are that the processing elements spend a substantial portion their time dealing with communications up and down the tree, which reduces the processing throughput of the system, and that each processing element must be aware of its place in the tree, requiring software overhead. These difficulties have, until now, substantially limited the extent of application of binary tree computing systems.

SUMMARY OF THE INVENTION

In order to overcome these and other problems with known binary tree computing systems, there is provided a binary tree computer system for connection to and controlled by a host computer that includes N bus controllers connected in a binary tree configuration in which each bus controller, except those at the extremes of the tree, are connected to left and right child bus controllers, where N is an integer; one of the bus controllers being a root bus controller for connecting the tree to the host computer. The system of the invention further includes N processing elements, one for each of the bus controllers and N+1 leaf processing elements connected, two each, as right and left children to the bus controllers at the extremes of the binary tree. Each of the processing elements includes a microprocessor and a memory and each of the bus controllers includes, for each processing element connected thereto, a buffered interface connecting the processing element to the bus controller for transmitting instructions and data between the bus controller and the connected processing element. Importantly, each bus controller further includes means for respectively writing and reading information into and from the memory of the connected processing element without involving the microprocessor of the processing element.

BRIEF DESCRIPTION OF DRAWINGS

These and other advantages and features of the invention will become more readily apparent with reference to the following description of a preferred embodiment of the invention in which.

DETAILED DESCRIPTION

Figure 1:
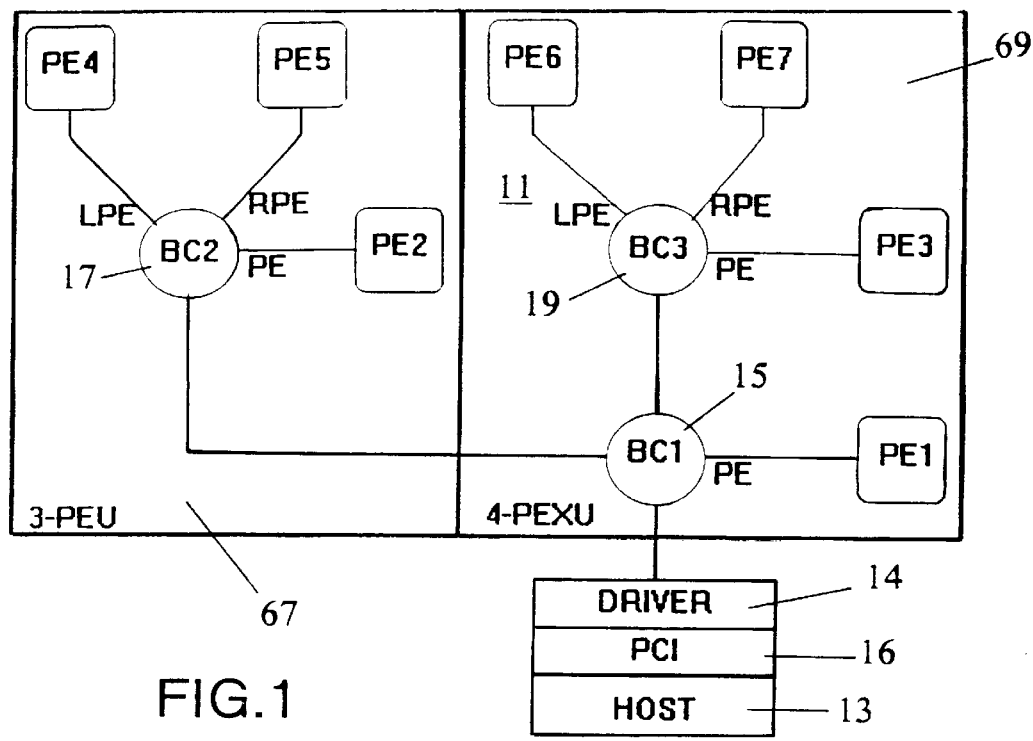
FIG. 1 is a schematic block diagram of a seven processor embodiment of a binary tree parallel computing system according to the present invention.

Referring to FIG. 1 of the drawings, the binary tree computing system 11 of the invention interconnects a number of Processor Elements (PEs) with each other and with a host computer 13 over a binary tree-bus. The tree-bus of the system illustrated in FIG. 1 consists of three bus control nodes 15, 17 and 19 designated as nodes BC1, BC2 and BC3, respectively. The three nodes connect seven PEs, designated as PE1 through PE7, to the host 13. All of the PEs are identical and in the illustrated embodiment consist of a microprocessor, such as an IBM PowerPC 603e microprocessor, and associated RAM memory with a bridge circuit interconnecting the two.

Node BC1 15 is the root node and attaches the tree to the host 13 through a driver 14 an interface, such as PCI bus 16. Node BC1 15 is connected to its own PE, designated as PE1, and to left child node BC2 17 and to the right child node BC3 19. The nodes BC2 and BC3 are each connected to their own PE's, PE2 and PE3 respectively, and to left and right child PEs, PE4 and PE5, and PE6 and PE7, respectively. PE4 through PE7 are referred to as the leaf PE's since they have no other children.

The system of FIG. 1 illustrates the basic structure of the binary tree parallel computer system of the invention. Each node BCx is connected upstream to a parent node, except for the root node BC1, which is connected to the host. Each node BCx is also connected downstream to its own PE and either to two child nodes BCx, or in the case of the nodes at the extremes of the tree, to right and left leaf PEs.

Figure 2:
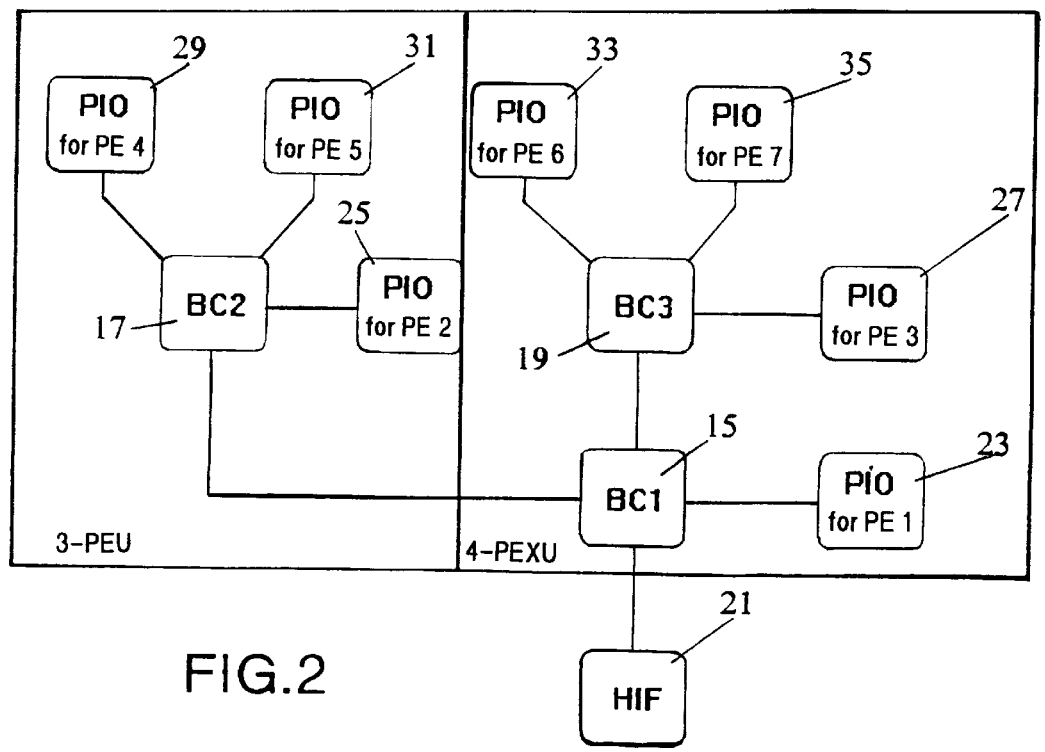
FIG. 2 is a more detailed schematic block diagram of the binary tree-bus of the computing system of FIG. 1.

Referring to FIG. 2 of the drawings, the binary tree-bus of the embodiment of FIG. 1 includes a host interface (HIF) 21, three tree-bus control nodes BC1 15, BC2 17 and BC3 19 and seven processor input/outputs (PIOs) 23, 25, 27, 29, 31, 33 and 35, one for each PE. The HIF 21 interfaces the binary tree-bus with the connection bus of the Host Computer 13. In the illustrated embodiment of the invention, this bus is preferably a PCI Bus, although others could be used. The BCxs act as buffered repeaters that transfer Function Calls and data from the Host Computer to the selected PE(s), and data with its Fault Message from the selected PE to the Host Computer. The PIOs transfer data between their respective PEs and the binary tree-bus in compliance with the Function Call requirements, and arbitrate access of the RAM associated with the respective PE between the needs of the PE's microprocessor and the binary tree-bus.

Figure 3:
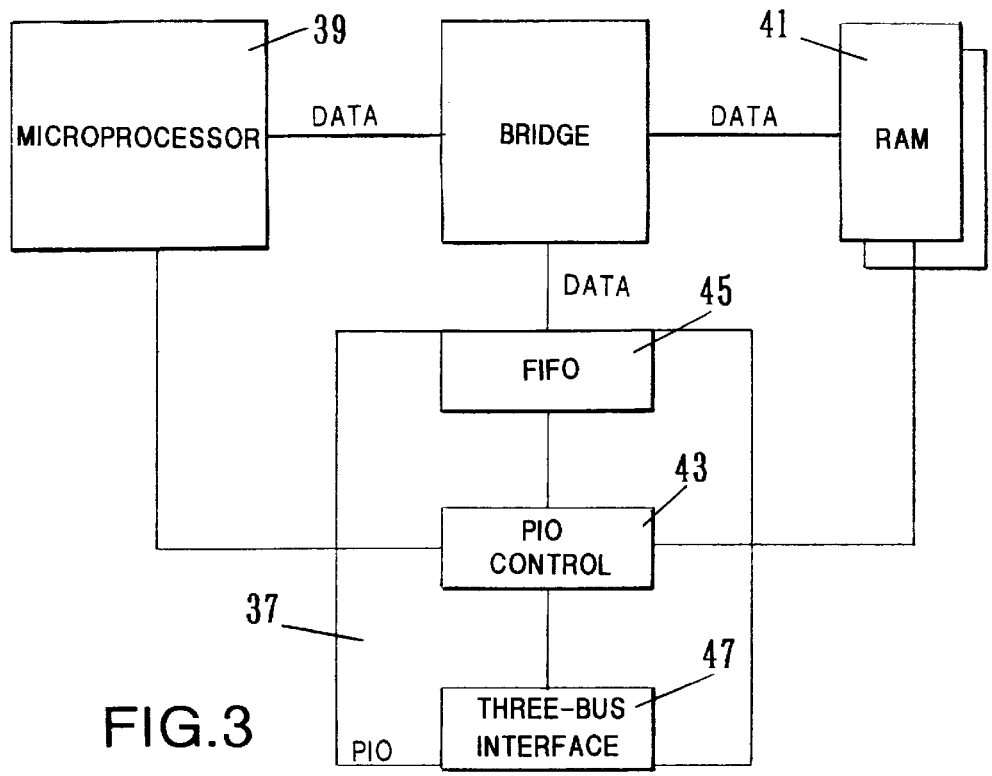
FIG. 3 is a block diagram of a processor input/output of a computing system according to the illustrated embodiment of the invention.

Referring to FIG. 3 of the drawings, the PIO 37 controls the read/writes of both the PE microprocessor 39 and the binary tree-bus with the RAM 41 of the PE. Data flows between the binary tree-bus and RAM 41 under the control of the PIO Control 43 of PIO 37. The PIO 37 also includes a buffer 45 that acts to accommodate delays in data transfer that may be caused by memory arbitration conflicts. The HIF 21 contains a similar buffer for the same reason.

In the illustrated embodiment, data on the binary tree-bus is four bytes wide plus four parity bits. When flowing toward the RAM 41, the data from the tree-bus is assembled by the PIO Control 43 into eight byte words with associated parity bits into a buffer 45. Data is transmitted from the buffer 45 to the RAM 41 in burst mode, unless only one double word is to be written.

Likewise, data is read from RAM 41 in burst mode and stored in PIO 37's buffer 45. The data in the buffer 45 is then disassembled into a four byte format and transmitted on the tree-bus through the tree-bus interface 47 under the control of the binary tree-bus control node BCx and the PIO Control 43.

The HIF, BCxs and PIOs are each preferably implemented with Field Programmable Gate Arrays (FPGAs).

In the illustrated embodiment, a fixed word length of eight byes (64-bits) plus an odd-parity bit per byte is used for data. Data are transferred on the Tree-Bus four bytes in parallel on each clock cycle signal. Function Call information is interpreted by the BCx.

In the binary tree computer system of the illustrated embodiment of the invention, the host computer 13 generates instructions referred to as Function Calls to control the operation of the system. The following are the Function Calls generated by the host computer in the illustrated embodiment of the invention:

Sreset Function Call causes one or all PEs to be reset.

Lfpga Function Call is used to establish logic controls used by the Field Programmable Gate Arrays (FPGA's) in the Binary Tree-Bus Control nodes (BCxs), PIO's, and HIF.

Initialization Function Call causes the BCxs to establish the identification (ID) of each PE in the System as a function of the ID contained in the Function Call. Identification of PEs is then maintained by the BCxs.

Load Function Call causes the Binary Tree-Bus Control nodes to route data to the PE specified by ID and its PIO to load its memory without involving the microprocessor. No microprocessor interrupts are involved.

Examine Function Call causes data read from a PE's memory to be transferred to the host without involving the microprocessor of the PE.

Release (reset) Function Call signals each microprocessor in the system to be operational.

Write Function Call causes the Binary Tree-Bus Control nodes to route data and a job specification to a specified PE and to write them into its memory. The interrupt is used to notify the microprocessor of a new job and that its data is available. The microprocessor acknowledges the acceptance of the new job. The microprocessor, however, may continue with the job being performed when the interrupt is acknowledged and then perform the new job as it occurs in a job queue.

Read Function Call uses an interrupt to the PE specified to ascertain whether data is ready to be read. When found to be ready, data is read from the PE's memory and transferred to the host computer.

Broadcast Function Call causes data and a job specification to be simultaneously transferred from the host computer to all of the PEs. Interrupt is involved in the same manner as Write above.

Resolve Function Call involves both read and write type functions with interrupt. When ready, data is read from the farthermost PEs and written into the PEs at the next level of the tree bus toward the host computer. In the case of the leaf PEs, the data is read into the PE of the BC to which they are connected. The PE at that level selects the "best results", according to a prescribed criteria, among its and the "best results" received. The "best results" are then transferred toward the host to the next level of the tree bus when a read function is received from that level. This process continues until the "best results" resolved by PE1 are transferred to the host computer.

Figure 4:
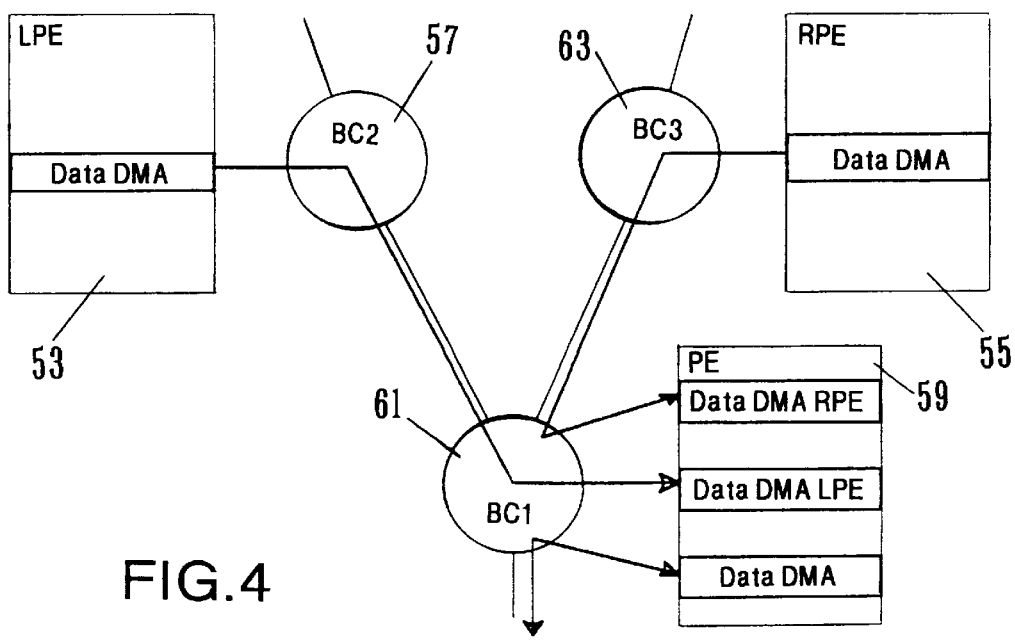
FIG. 4 is a block diagram of a portion of the illustrated embodiment showing data paths during execution of a particular Function Call.

FIG. 4 illustrates an example of the Resolve Function Call. The "best results" are computed by the LPE 53 and the RPE 55 and are stored in their associated memory starting at address "Data DMA". The best results are then transferred from LPE 53's memory via BC2 57 to the memory of PE 59, starting at address Data DMS LPE by BC1 61. Next the best results are transferred from the memory of RPE 55 via BC3 63 to the memory of PE 59 starting at location Data DMA RPE by BC1 61. Finally, PE 59 selects the best results among those received from LPE 53 and RPE 55 and that which PE 59 itself computed and the results are stored in PE 59's memory starting at location Data DMA.

Time-Outs included in Function Calls involved with data transfer are used by BCs to monitor slack times and prevent the system from getting hung up without a means to restart. Time-out values are set by the host software and may be changed if experience demonstrates them to be too short or too long. Time-Outs are used by BCs when data transfer flow is interrupted or while waiting for a job's completion. There is Time-Out Counter in each of the BCs. The Time-Out field in the Function Call is one byte (8-bit), however, the Time-Out Counter has a precision of two bytes (16-bits). The value in the Time-Out field of the Function Call is compared to the more significant byte of the Time-Out Counter. The Time-Out Counter is reset to all zeros each time before it is used. The Time-Out Timer is advanced by the clock signal used for data transfer. If the Time-Out elapses while waiting for a data transfer to occur during a read function, the BC completes the transfer of N double words filled with blanks with the Fault Message appended. If the Time-Out in the Function Call is set to all zeros, Time-Outs are not performed. If more than one Time Out fault occurs during a function, the one nearest to the Host computer is reported.

A "Fault Message" is appended to the end of each stream of data being transferred to the host computer. It consists of four bytes that contain the ID of the PE or BC in which the fault condition is detected followed by two bytes that identify the fault condition. A Fault Message is also appended when no fault is detected to indicate as such. The Fault Message is originated by a PIO and can be amended by a BC. If more than one fault condition is detected, the one nearest the host is used. If more than one fault has been detected in a PIO or BC, the one occurring last is reported.

Most sequences of Function Calls involve alternating "read" and "write" functions. Fault conditions detected during a "write" function are reported on the subsequent "read" function provided the same PE/BC is involved in both. Typical fault conditions in the system of the illustrated embodiment of the invention include Function Call faults, time-outs, parity errors, incomplete data transfer, memory address out of range and microprocessor faults.

If a non-admissible code occurs in a Function Call, the condition is usually detected by BC1 15. A non-existing ID is detected by a BC at the furthermost level from the host computer 13 when none of its leaf's IDs match with ID.

Parity errors can occur during Function Call or Data transfers on the tree-bus. Parity errors may also be detected during data/address transfers in the microprocessor or in PE's memory.

If a total of N double words are not transferred, a fault is indicated by the PIO involved.

A data Overflow fault is declared if data is lost during data transfer. This should also be detected if other than N words are transferred.

Figure 5:
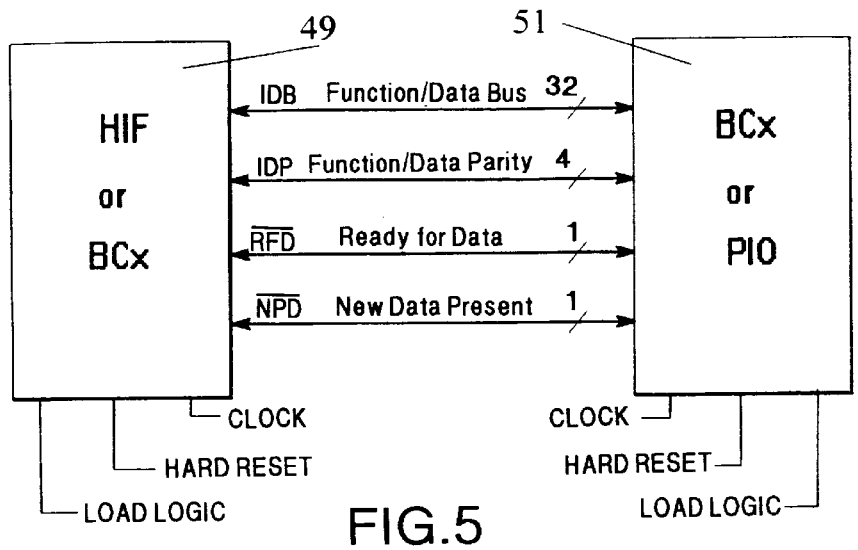
FIG. 5 is a block diagram showing the signal lines in the tree-bus of the illustrated embodiment of the invention.

FIG. 5 of the drawings illustrates the tree-bus signal lines. Such signal lines are illustrated as being between a block 49, which can be the HIF 21 or a BCx, and another block 51, which can be another BCx or a PIO connected to a PE. Tree-Bus signal lines used to transfer Function Calls and Data consist of:

IDB (Function/Data Bus) Thirty two bi-directional parallel lines used to transfer data and function information.

IDP (Function/Data Parity) Four bi-directional lines used to transfer the odd parity bits for the corresponding bytes on the IDB bus.

$\overline{\text{RFD}}$ (Ready for Data) The HIF, BCx or PIO is ready to receive the next two bytes of data.

$\overline{\text{NDP}}$ (New Data Present) The HIF, BCx or PIO has new data present to be transferred.

Additional signals used that are not in the Tree-Bus include Clock for timing cycles, Hard Reset, and Load Logic.

Figure 6:
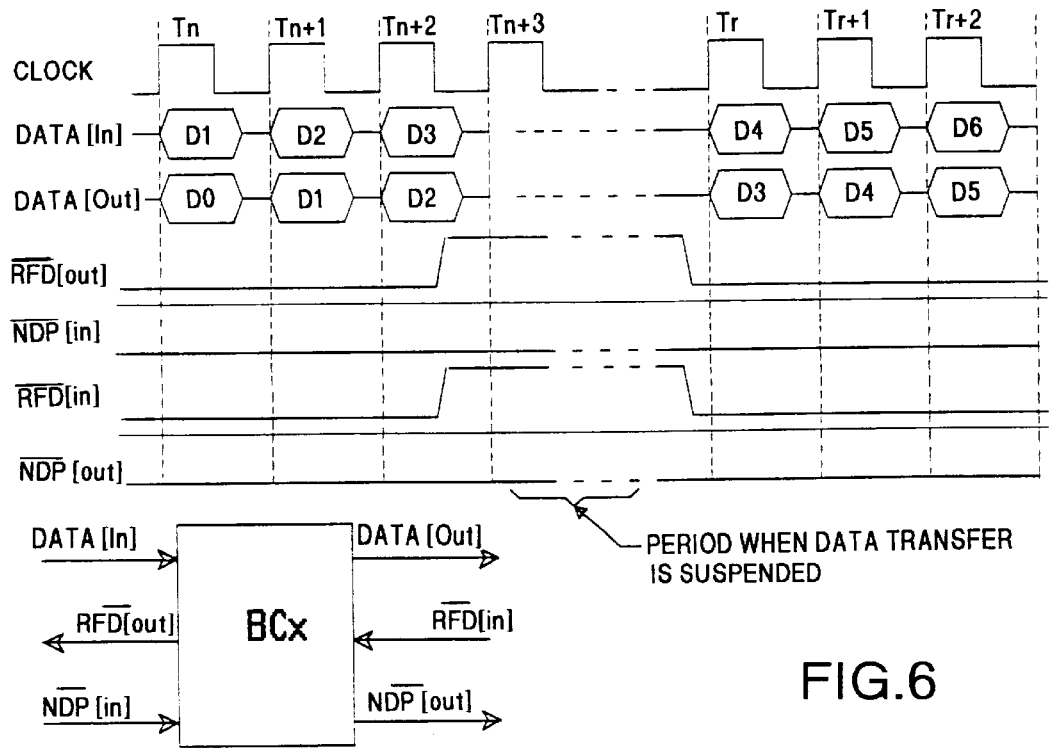
FIG. 6 is a timing diagram of data flow in the tree bus.

Bus Control Nodes (BCx) operate as repeaters to act collectively as a bucket brigade to transfer data between the HIF and the PEs, and PEs to PEs. Referring to the timing diagram of FIG. 6, this is accomplished with the use of the "Ready for Data" $\overline{\text{RFD}}$ and "New Data Present" (NDP) signals. As illustrated in FIG. 6, data are transferred through the BCx (DATA IN and DATA OUT) on consecutive clock cycles until RFD (IN) is unasserted by the next down-stream BC in the chain indicating that it is not ready to accept another data transfer. This causes the BCx to unassert RFD (OUT) to cause the data transfer to pause-up stream. In this case, RFD (IN) is reasserted such that data transfer may resume. BCx retains data until the transfer process continues so that there is no loss of data when the flow of transfers in momentarily interrupted.

In accordance with an aspect of the present invention, the binary tree computer system can advantageously be constructed from a plurality of sub-units. For instance, the seven PE version of the invention illustrated in FIGS. 1 and 2 of the drawings is made up of a three PE unit (a "PEU") 67 connected to a four PE expansion unit ("PEXU") 69.

The smallest set of PEs in a system in accordance with the invention is three. In such a configuration, PE2 and PE3 are in the leaf positions. This configuration can be scaled to seven PEs by using a 3-PEU in conjunction with a four 4-PEXU expansion unit that conveniently can be disposed on a single printed circuit board. In this configuration PE4 through PE7 are leafs by virtue of being located at "leaf" physical locations on the printed circuit board. To scale-up from a three to seven PE system the BC of the 3-PEU is connected to the first BC of the 4-PEXU which is connected to the host interface.

Figure 7:
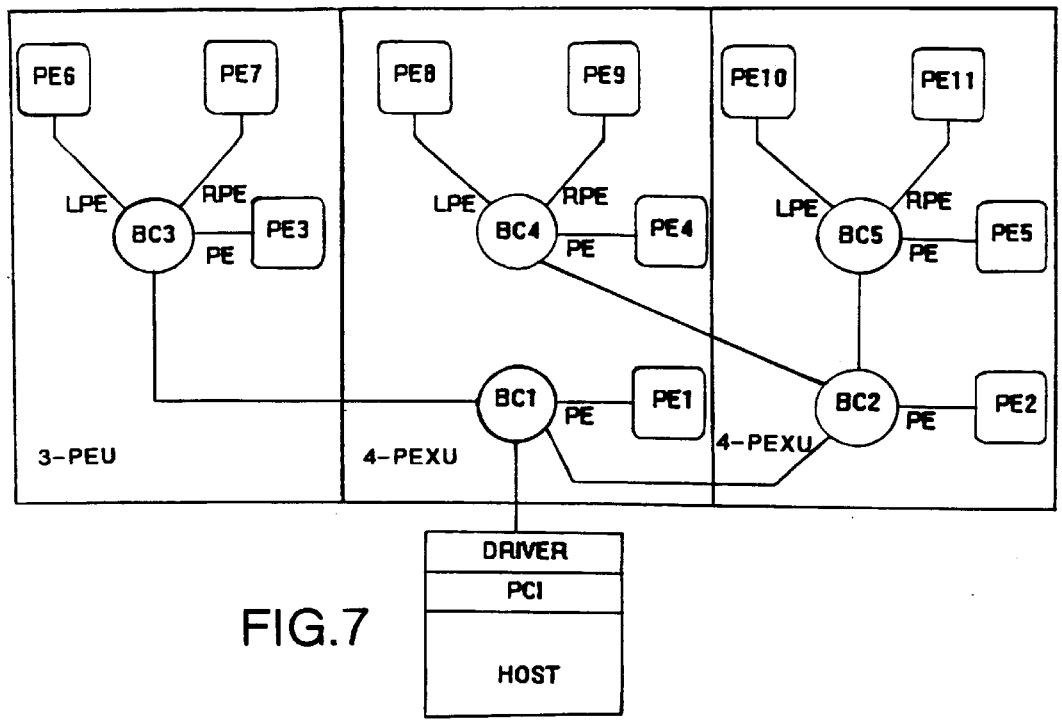
FIG. 7 is a block diagram of an eleven processor embodiment of the invention.
Figure 8:
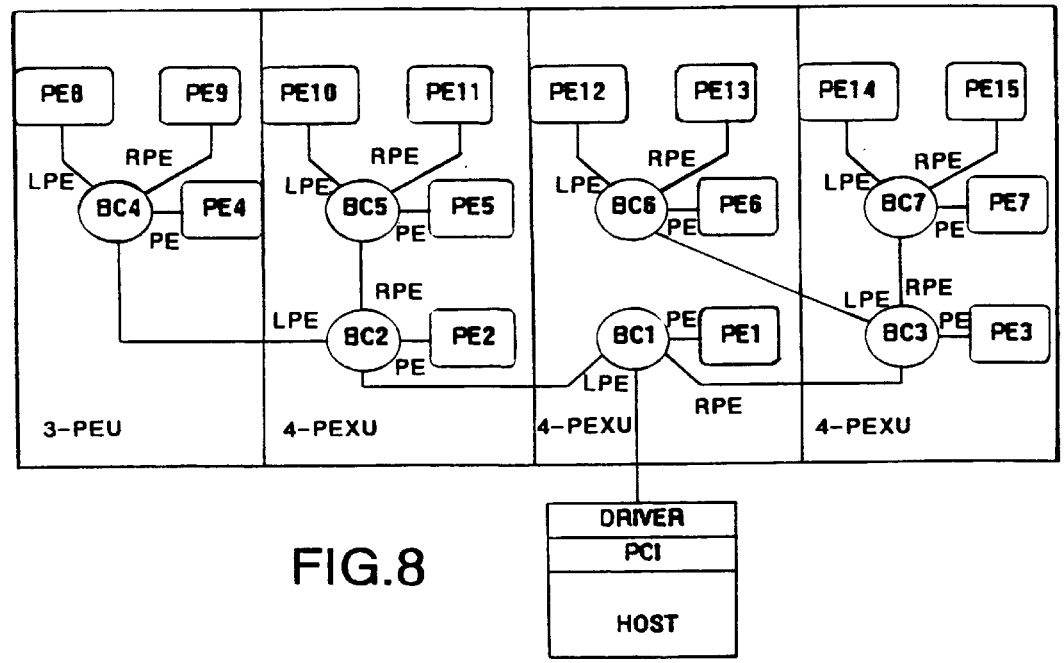
FIG. 8 is a block diagram of a fifteen processor embodiment of the invention.

As illustrated in FIG. 7 of the drawings, by adding an additional 4-PEXU, the configuration can continue to be expanded to eleven PEs. This results in an asymmetrical tree which is permitted in the architecture. The eleven PE configuration can be expanded further into the fifteen PE configuration depicted in FIG. 8 by the addition of another 4-PEXU. This process can be continued indefinitely bu adding further 4-PEXU's to construct a binary tree of the desired size. In general, a tree constructed in accordance with this aspect of the invention will be constructed from one 3-PEU and as many 4-PEXU's as necessary. Therefore the binary tree can be expanded indefinitely with only two printed circuit board types, i.e. 3-PEU and 4-PEXU. The 4-PEXU has optional connections from the first BC. For example, in FIGS. 1 and 7, BC1 is routed to BC2. In FIG. 8, BC1 is routed to BC3 on the same printed circuit board.

It is significant that, as seen from FIGS. 1, 7 and 8, the PE's positioned along one edge of the printed circuit boards are always leaf PE's. Therefore, the BCx's know which PE's attached to them are leaf PE's.

The binary tree computer system of the present invention is particularly useful in dealing with applications such as speech or other pattern recognition, where a series of units of data have to be compared with a large number of possible values in order to find the best match for each unit. In solving such types of problems, the speech or other pattern data that is to be interpreted is broken into short segments that are then compared against a large data base of standards to find the best match for each. The best matches are then assembled to identify the words being spoken. The binary tree computer system of the present invention is particularly suited to the solution of such problems since they involve a very large number of similar calculations and comparison functions that can be accomplished efficiently in parallel with the best results brought back to the host.

The host first distributes the necessary comparison software and different subsets of the standards against which speech segments are to be compared during the recognition process to the PEs over the tree-bus. Using the Broadcast Function Call, the host then sequentially broadcasts the successive speech segments to all of the PEs in parallel. The PEs each compare the speech segments with the data base stored in its associated memory to determine the closest match and stores an identification and closeness of the match in a predetermined location in its associated memory. If no match exists within a defined comparison distance, the PE merely stores an indication of no match in such memory location. Then, using the Resolve Function Call, the host causes the left and right leaf PEs of each BC at the extremes of the tree, in the manner described above, to transfer their results to the BC's own PE where the closest of all three matches is selected and sent to the next level up the tree. This process is repeated at each level until the closest match determined by any of the PEs is calculated by the root PE and forwarded to the host. The assembly of the recognized segments into words is performed in the host.

A plurality of speech segments can be stored in the memory of each PE by the host computer without interrupting the PE. The PE performs its comparison calculations at its own speed and stores the results in the appointed memory locations without having to wait for the host or other PEs of the tree. The tree bus then moves the results toward the host at a rate determined by the host and the tree bus clock. In this manner the PEs can work at peak efficiency without having to wait for other parts of the system, and system throughput is maximized. The PIO's arbitrate any conflicting demands for memory access by the BC and the microprocessor of the PE.

If a BC of the tree bus is not ready to receive or send information up or down the tree, it unasserts its $\overline{RFD}$ signal which causes all the BCs in the path of the information to pause until the signaling BC is ready. Thus any temporary bottlenecks in the system are absorbed by the tree bus rather than being allowed to slow down the PEs.

What is claimed is:

1. A binary tree computer system for connection to and control by a host computer, comprising:

N bus controllers connected in a binary tree configuration in which each bus controller, except those at the extremes of the tree, are connected to left and right child bus controllers, where N is an integer greater than 2, one of said bus controllers being a root bus controller for connecting said binary tree connected bus controllers to said host computer;

N processing elements, one attached to each of said bus controllers;

N+1 leaf processing elements connected, two each, as right and left children to the bus controllers at the extremes of said binary tree;

each of said processing elements including a microprocessor and a memory;

each of said bus controllers including, for each processing element connected thereto, a buffered interface connecting said processing element to said bus controller for transmitting instructions and data between the bus controller and the connected processing element, and means for writing information into the memory of the connected processing element without involving the microprocessor of said connected processing element.

2. The binary tree computer system of claim 1 wherein each of said bus controllers includes means for reading information from said memory of the connected processing element without involving the microprocessor of said connected processing element.

3. The binary tree computer system of claim 1 wherein each of said bus controllers further includes means for interpreting instructions received from the host computer and for executing such instructions addressed to it and for passing instructions to bus controllers down the tree bus if such instruction is addressed to one or more of such bus controllers.

4. The computer system of claim 1 wherein each of said bus controllers further include means for generating a signal when it is not ready to send information up or down the tree to cause all the bus controllers in the path of the information to pause until the bus controller generating such signal ceases to do so.

5. The computer system of claim 1 having M bus controllers, where M is an odd integer greater than 1, further including a plurality of printed circuit boards, and wherein one of said bus controllers is disposed on one of said printed circuit boards and the remaining bus controllers are disposed, two each, on additional ones of said printed circuit boards.

6. The computer system of claim 5 wherein the leaf processing elements are all arranged along one edge of said printed circuit boards.

7. A binary tree computer system for connection to and control by a host computer, comprising:

N bus controllers connected in a binary tree configuration in which each bus controller, except those at the extremes of the tree are connected to left and right child bus controllers, where N is an integer greater than 2, one of said bus controllers being a root bus controller for connecting said binary tree connected bus controllers to said host computer;

N processing elements, one attached to each of said bus controllers;

N+1 leaf processing elements connected, two each, as right and left children to the bus controllers at the extremes of said binary tree;

each of said processing elements including a microprocessor and a memory;

each of said bus controllers including means for interpreting instructions received from the host computer and for executing such instructions addressed to it and for passing instructions to bus controllers down the tree bus if such instruction is addressed to one or more such bus controllers.

8. The computer system of claim 7 wherein each of said bus controllers further include means for generating a signal when it is not ready to send information up or down the tree to cause all the bus controllers in the path of the information to pause until the bus controller generating such signal ceases to do so.

9. The computer system of claim 7 having M bus controllers, where M is an odd integer greater than 1, further including a plurality of printed circuit boards, and wherein one of said bus controllers is disposed on one of said printed circuit boards and the remaining bus controllers are disposed, two each, on additional ones of said printed circuit boards.

10. The computer system of claim 9 wherein the leaf processing elements are all arranged along one edge of said printed circuit boards.

* * * * *